Jan. 19, 1960 B. M. SCIVALLY Re. 24,766

WELL SCRAPING APPARATUS

Original Filed June 6, 1955

Bernice M. Scivally
INVENTOR.

BY Charles E. Lightfoot
ATTORNEY

United States Patent Office

Re. 24,766
Reissued Jan. 19, 1960

24,766

WELL SCRAPING APPARATUS

Bernice M. Scivally, Houston, Tex.

Original No. 2,804,152, dated August 27, 1957, Serial No. 513,480, June 6, 1955. Application for reissue February 18, 1958, Serial No. 715,990

5 Claims. (Cl. 166—173)

Matter enclosed in heavy brackets [ ] appears in the original patent but forms no part of this reissue specification; matter printed in italics indicates the additions made by reissue.

This invention relates to well scraping apparatus, and more particularly to a casing scraper adapted to be inserted in a well casing for scraping the inside of the same.

The present application is a continuation in part of a previous application of the same applicant for a casing scraper, Serial Number 247,037, filed September 18, 1951, now Patent No. 2,710,657 granted June 14, 1955.

The invention has for an important object the provision of well scraping apparatus which is adapted for attachment to a string of drill pipe, whereby the same may be lowered into a well casing for smoothing and conditioning the inside of the same.

Another object of the invention is to provide well scraping apparatus which is constructed to be inserted in a string of drill pipe to follow the cutting bit, for the purpose of scraping off cement, or the like, left inside the casing from a previous cementing operating, and for removing burrs resulting from the perforation of the casing.

A further object of the invention is the provision of well scraping apparatus which is effective for removing material coating the inside of a well casing either by upward or downward movement of the apparatus in the casing, or by rotation of the same therein.

Another object of the invention is to provide well scraping apparatus, which includes a body adapted for insertion in a string of drill pipe, and which is provided with scraping blades movable radially outwardly of the body for engagement with the material to be removed, said apparatus including means for yieldably maintaining the scraping blades in extended condition.

A further object of the invention is the provision of well scraping apparatus having an outer tubular scraper body or barrel adapted to be connected into a string of well pipe and within which an inner tube or wash pipe is located, which is connected into the string to form with the barrel an annular chamber surrounding the washpipe and from which fluid in the string is excluded, the barrel being provided with openings in which scraper elements are movably positioned for radial movement inwardly and outwardly of the barrel, there being a tubular element of yieldable material in the chamber surrounding the washpipe and positioned to engage the inner ends of the scraper elements to yieldingly urge the elements outwardly and means for admitting fluid into the chamber and into the interior of the tubular element from the exterior of the barrel to equalize the pressure of fluid within the tubular element with the pressure exteriorly of the barrel.

Figure 2:
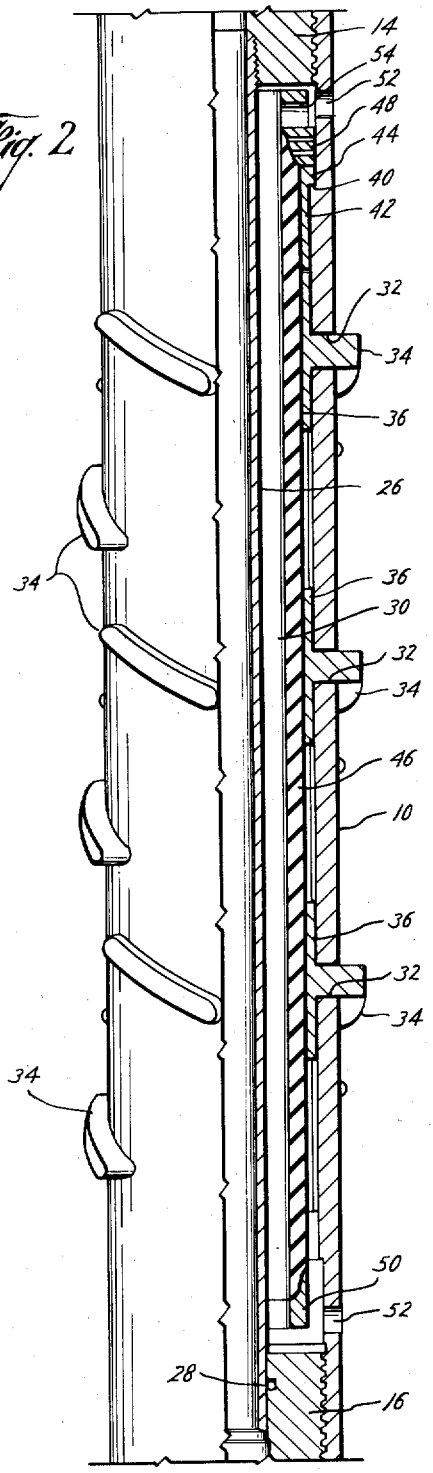
Figure 1:
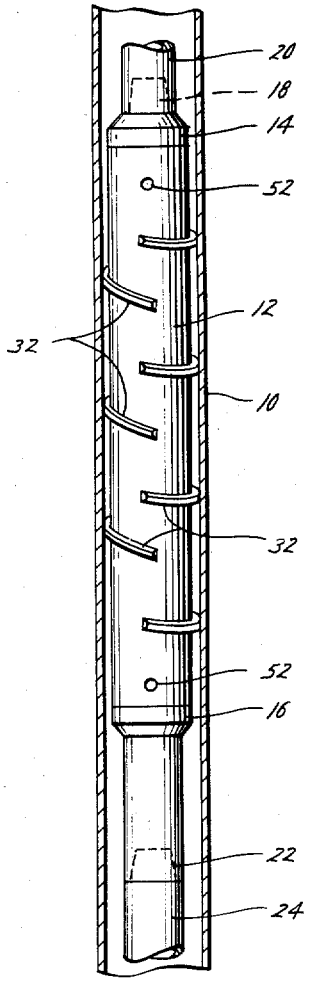

The above and other objects and advantages of the invention will be apparent from the following description, constituting a specification of the same, when taken in conjunction with the annexed drawings, wherein:

Figure 1 is an elevational view of the invention, showing the same connected in assembled condition, connected into a drill stem or well pipe and positioned in a well casing ready for the carrying out of a scraping operation; and Figure 2 is a fragmentary view, partly broken away and partly in cross-section and on an enlarged scale illustrating details of construction of the invention.

Referring now to the drawings in greater detail the invention is shown in position for operation in a well casing, which is indicated at 10. Such a casing may have been previously perforated, resulting in the formation of burrs or other irregularities in the interior surface thereof, or the well may have been subjected to cementing or other process and thereafter rebored, leaving a coating of cement or the like, which it is desired to remove by a scraping operation. It is for the purpose of removing such burrs or coating, or other irregularities on the interior surface of the casing that the present scraping apparatus has been designed.

The well scraper of the invention includes an outer tubular scraper body or barrel 12, which is internally threaded at its opposite ends of connection to externally threaded, upper and lower, tubular connector elements 14 and 16, respectively. The upper connector element 14 has an externally threaded pin portion 18 at its upper end for threadable connection to the lower end of an upper section 20 of a string of well pipe, and the lower connector element 16, may have an internally threaded box portion 22 at its lower end for threadable connection to the upper end of a lower section 24 of the well pipe.

Within the barrel an inner tubular member or wash pipe 26 is located, which is externally threaded at its upper end for connection to the internally threaded lower end of the upper connector element 14 and which extends downwardly into the interior of the lower connector element 16.

Suitable packing such as the O-ring 28 seated in an internal groove in the lower connector element provided for that purpose, surrounds the wash pipe 26 and forms a fluid tight seal between the same and the lower connector element. As best seen in Figure 2 an annular chamber 30 is formed between the barrel and wash pipe, whose upper end is formed by the lower end of connector 14 and whose lower end is formed by the upper end of connector 16, and the barrel is provided with openings 32, helically arranged in spaced relation thereabout, the openings being preferably in the form of elongated slots, and being disposed in circumferentially overlapping relation.

Scraping blades 34 of somewhat smaller cross-sectional area than the openings 32 project through the openings for radial movement inwardly and outwardly of the barrel, each of these blades being provided with a carved backing plate 36 disposed within the chamber 30.

The barrel 10 is formed with an internal, upwardly facing shoulder 40, in the chamber 30, spaced somewhat below the lower end of the connector 14, and a spacer ring 42, having an external enlargement 44 at its upper end is fitted into the barrel, with said enlargement sealed on said shoulder.

Within the chamber 30 a yieldable tubular element 46 is disposed in surrounding relation to the wash pipe 26 and whose outer surface is in engagement with the inner faces of the backing plates 36. This tubular element is preferably formed of a yieldable material, such as rubber, and is of a size and thickness to yieldingly urge the scraper elements to their outermost positions, as best seen in Figure 2. At its upper end the element 46 may have a ring 48 attached exteriorly therein, which ring is engageable with the upper surface of the spacer ring 42 to support the tubular element in the chamber, and at its lower end the element 46 may have a ring 50 attached thereto. It will be seen that the tubular yieldable element 46 is thus supported in the chamber 30 with its ends spaced somewhat inwardly of the ends of the chamber, so that the element is open at its top and bottom.

The barrel 10 is provided with upper and lower openings 52 leading into the chamber 30 near the upper and lower ends of the chamber and opening exteriorly of the barrel.

The ring 48 may extend upwardly above the upper end of the tubular element 46 for engagement with the lower face of the upper connector 14 to limit upward movement of the element in the chamber, and one or more openings 54 are provided in the ring 48 through which fluid may readily flow into or out of the upper end of the tubular element.

The outer ends of the scraper blades 34 are rounded to conform to the contour of the interior of the well casing and may be of hardened metal or provided with a heat treated metal coating such as hastelite or the like.

In the operation of the invention, the apparatus, assembled as shown in the drawings, with the tool connected into the drilling string and the cutting bit attached to the lower end of the tool, is in condition for insertion in the well. During the lowering of the tool in the well, the blades 34 may move inwardly against the outward force of the tubular element 46, so that the blades are yieldingly engaged with the wall of the well or casing to allow the tool to pass surface irregularities or obstructions, and to cause the blades to scrape off material on the inside of the well bore or casing. Rotation of the drill then results in an upward spiral or helical scraping action of the blades.

Because of the openings 52 in the barrel 10 fluid in the well surrounding the tool may enter the chamber 30 and pass to the inside of the tubular element 46, so that the pressure of fluid inside and outside of the element is equalized.

It will be noted that because of the helical arrangement of the scraping blades rotation of the tool to the left produces an upward movement of any material scraped by the blades from the inside of the casing. Moreover, due to the spacing of the blades the drilling mud or fluid may pass freely between the same, and any material such as cement, steel, burrs or other cuttings produced by the cutting bit may be borne upwardly therewith.

It will also be apparent that the scraping blades extend entirely about the periphery of the tool so that they will perform a cutting action when the drill pipe is raised or lowered as well as when it is rotated.

The diameter of the tool with the scraping blades fully extended is preferably somewhat less than the internal diameter of the well casing, so that the casing will not be damaged by continued use of the tool, but the latter will effectively smooth and condition the inside of the casing.

It will thus be seen that the invention as described above provides a well scraping tool of simple design and rugged construction capable of withstanding the hard wear and long usage to which such a device is likely to be subjected.

While the invention has been disclosed in connection with a particular embodiment of the same, it is to be understood that this is for the purpose of illustration only, and numerous changes and modifications can be made in the various parts without departing from the spirit of the invention or the scope of the appended claims.

Having thus clearly shown and described the invention what is claimed as new and desired to secure by Letters Patent is:

1. In a well scraping device adapted to be positioned in the bore of a well, an outer tubular barrel, an inner tubular member in the barrel, means connected to the barrel and engaging the member to hold the member in radially inwardly spaced relation to the barrel to form an annular fluid chamber exteriorly of the member, said barrel having a plurality of elongated openings helically disposed in overlapping relation entirely about the periphery of the barrel opening into the chamber and leading to the exterior of the barrel, scraper means movably disposed in the openings and extending into the chamber, a tubular element of resilient material in the chamber and whose exterior is in engagement with said scraper means, means for admitting fluid under pressure in said chamber into the interior of said element to expand the element to yieldingly urge the scraper means outwardly of the barrel and means for admitting fluid under pressure from the exterior of the barrel into said chamber.

2. In a well scraping device adapted to be positioned in the bore of a well, an outer tubular barrel, an inner tubular member in the barrel, means connected to the barrel and engaging the member to hold the member in radially inwardly spaced relation to the barrel to form an annular fluid chamber exteriorly of the member, said barrel having a plurality of longitudinally spaced elongated openings disposed about the periphery of the barrel opening into the chamber and leading to the exterior of the barrel, scraper means movably disposed in the openings and extending into the chamber, a tubular element of resilient material whose length is less than the length of said chamber positioned in the chamber in engagement with said scraper means, means on said element and barrel positioned for engagement to hold said element against longitudinal movement relative to said barrel with the ends of the element in inwardly spaced relation to the ends of the chamber to establish fluid flow communication between the chamber and the interior of the element, and means for admitting fluid from the exterior of the barrel into said chamber to cause said element to be expanded to yieldingly urge said scraper means outwardly of the barrel.

3. In a well scraping device adapted to be positioned in the bore of a well, an outer tubular barrel, an inner tubular member in the barrel, means connected to the barrel and engaging the member to hold the member in radially inwardly spaced relation to the barrel to form an annular fluid chamber exteriorly of the member, said barrel having a plurality of longitudinally spaced elongated openings disposed about the periphery of the barrel opening into the chamber and leading to the exterior of the barrel, scraper means movably disposed in the openings and extending into the chamber, a tubular element of resilient material in the chamber and spaced radially outwardly from the interior of the member and whose length is less than the length of the chamber to provide a space between the exterior of the member and the interior of the element whose ends are in communication with the interior of the chamber, the exterior of said element being in engagement with said scraper means and means for admitting fluid from the exterior of the barrel into said chamber, to cause said element to be expanded to yieldingly urge said scraper means outwardly of the barrel.

4. In a well scraping device adapted to be positioned in the bore of a well, an outer tubular barrel, an inner tubular member in the barrel, means connected to the barrel and engaging the member to hold the member in radially inwardly spaced relation to the barrel to form an annular fluid chamber exteriorly of the member, said barrel having a plurality of longitudinally spaced elongated openings disposed about the periphery of the barrel opening into the chamber and leading to the exterior of the barrel, scraper means movably disposed in the openings and extending into the chamber, a tubular element of resilient material in the chamber in radially outwardly spaced relation to the exterior of said member to provide an annular space between the interior of the element and the exterior of said member the interior of said element being in engagement with said scraper means and means for admitting fluid from the exterior of the barrel into the interior of said element to expand the element to yieldingly urge said scraper means outwardly of the barrel.

*5. In a well scraping device adapted to be positioned in the bore of a well, an outer tubular barrel, an inner tubular member in the barrel, means connected to the barrel and engaging the member to hold the member in*

*radially inwardly spaced relation to the barrel to form an annular fluid chamber exteriorly of the member, said barrel having a plurality of longitudinally spaced elongated openings disposed about the periphery of the barrel opening into the chamber and leading to the exterior of the barrel, scraper blades movably disposed in the openings for radial movement into and out of positions with the outer ends extending beyond the external surface of the barrel and extending into the chamber and formed with curved inner end portions in the chamber whose curvature conforms to the curvature of the inner surface of the wall of the barrel, a tubular element of resilient material in the chamber whose external surface is curved*

*to conform to the curvature of said inner surface of the wall of the barrel and is in engagement with the inner ends of said blades to yieldingly hold the blades against radial inward movement and means for admitting fluid from the exterior of the barrel into the interior of said element.*

References Cited in the file of this patent
or the original patent

| | | |
|---|---|---|
| 451,841 | Platt et al. | May 5, 1891 |
| 2,438,673 | McMahan | Mar. 30, 1948 |
| 2,627,925 | Scivally | Feb. 10, 1953 |
| 2,710,657 | Scivally | June 14, 1955 |